March 1, 1960     H. SONNBERGER     2,926,582
ROTARY DISC SHUTTERS FOR PHOTOGRAPHIC CAMERAS
Filed Sept. 9, 1955     5 Sheets-Sheet 2

INVENTOR.
Heinrich Sonnberger
BY
Singer, Stern & Carlberg
Attorneys

March 1, 1960 H. SONNBERGER 2,926,582
ROTARY DISC SHUTTERS FOR PHOTOGRAPHIC CAMERAS
Filed Sept. 9, 1955 5 Sheets-Sheet 3

INVENTOR.
Heinrich Sonnberger
BY
Singer, Stern & Carlborg
Attorneys

March 1, 1960     H. SONNBERGER     2,926,582
ROTARY DISC SHUTTERS FOR PHOTOGRAPHIC CAMERAS
Filed Sept. 9, 1955     5 Sheets—Sheet 5

INVENTOR.
Heinrich Sonnberger
BY
Singer, Stern + Carlberg
Attorneys

United States Patent Office 2,926,582
Patented Mar. 1, 1960

2,926,582

ROTARY DISC SHUTTERS FOR PHOTOGRAPHIC CAMERAS

Heinrich Sonnberger, Heidenheim (Brenz), Germany, assignor to Carl Zeiss, Overkochen, Wurttemberg, Germany Application September 9, 1955, Serial No. 533,280

Claims priority, application Germany September 13, 1954

3 Claims. (Cl. 95—61)

The invention relates to shutters for photographic cameras and particularly to rotary disc shutters especially suitable for aircraft cameras. It has been proposed heretofore to provide a rotary disc shutter of the mentioned type with four shutter discs, each of which is provided at its circumference with an aperture or a recess forming an exposure aperture. These known shutter discs overlap with their circumferences and rotate each in a separate plane which are parallel to each other, but of necessity are also spaced from each other. The discs are arranged in such a manner that they alternately uncover one opening and close the same again. The speed at which this happens constitutes a measure for the exposure time. This known construction of the shutter has the disadvantage that the four discs have to be arranged very closely adjacent to each other because the space available for the shutter between the lenses of the photographic objectives is very limited. Furthermore, since the marginal portions of these discs overlap each other, it is not possible to rotate the discs with a very great speed, because the slightest deviation of a disc from its plane of rotation has the result that the disc will touch an adjacent disc and this will injure the discs so that the shutter is being destroyed.

It is an object of the present invention to overcome these disadvantages of the known rotary disc shutters by arranging the shutter discs which determine the exposure time in only two planes. When this is done, there is saved considerable space, and the discs need not be arranged as close to each other as formerly. It is also possible to rotate the shutter discs with a very high speed so that very short exposure times can be obtained.

According to another object of the invention, there are provided two rotary shutter discs in a single plane and the two shutter discs in said plane do not overlap each other with their marginal portions but almost touch each other in the optical axis so that a very small aperture may appear in the optical axis when the shutter is closed. It has been proven, however, that this aperture is extremely small and does not at all influence the exposure.

Still another object of the invention is to provide a rotary disc shutter in which it is possible to select a predetermined succession of the successive exposure positions of the rotary discs, which discs determine the exposure time. For this purpose, there is provided an additional shutter disc which is rotated with a slower speed. Only when this additional shutter disc, in addition to the other four discs, uncovers the aperture of the photographic objective, an exposure of the light sensitive material in the camera can take place. For the selection of a series of exposures, according to the timely succession of the pictures to be taken—for instance, in connection with an exposure regulator, such as an intervalometer, it is advisable to employ still another disc, or a pivotally mounted shutter blade, provided with an opening which may be brought into alinement with the optical axis of the photographic objective. The exposure then takes place as desired, by moving the opening of the last mentioned additional shutter blade into the path of the light passing through the objective. The movement of this additional shutter blade may take place by means of a control member which may suitably be electrically operated by an electric release impulse which causes the shutter blade to move into the path of light, which control impulse, for example, may be released by the exposure regulator and includes also a synchronising device which permits the additional shutter blade to move in the exposure position only when at the same time the other mentioned rotary shutter discs are in this exposure position. This construction is necessary in order to insure that in view of the high speed with which the shutter discs rotate, the shutter blade which is movable into the path of light, will reach this position in that instant in which the rotary shutter discs are in their exposure position.

It is also an object of the invention to employ for the control member a rotatable cam which is rotated in synchronism with the additional shutter disc which determines the succession of the exposures. This cam actuates by means of a lever a pivotally mounted shutter blade which is movable with an opening into the path of light. The lever is connected with a locking device which releases the lever only when the cam has reached a predetermined position, and provided that at that time a release impulse actuates the locking device.

Other objects of the invention will appear from the following description of the invention in connection with the accompanying drawings.

Figure 1:
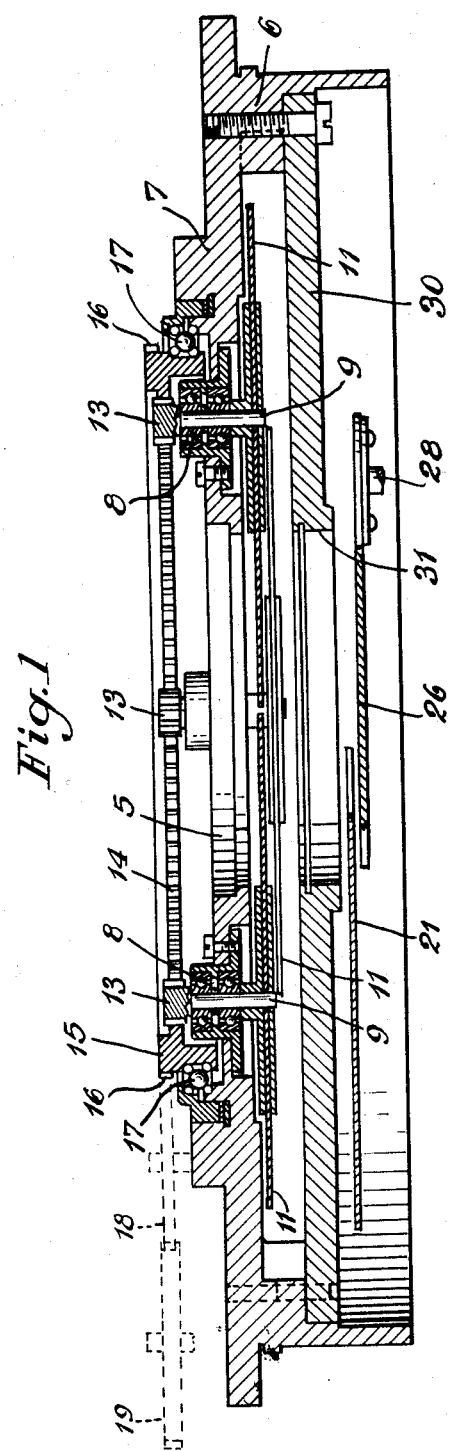
Fig. 1 illustrates a sectional view of the rotary disc shutter substantially along the line I—I of Fig. 2.
Figure 2:
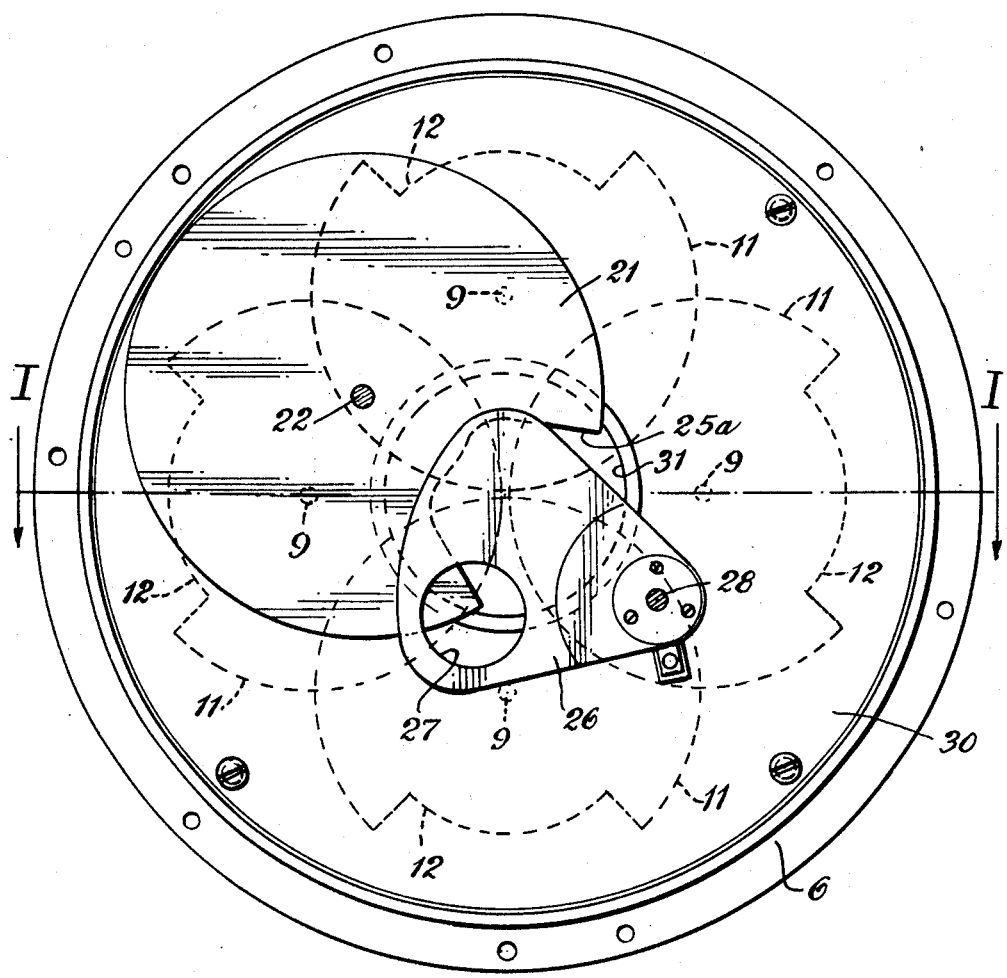
Fig. 2 is a bottom view of the shutter illustrated in Fig. 1 with certain parts omitted.
Figure 3:
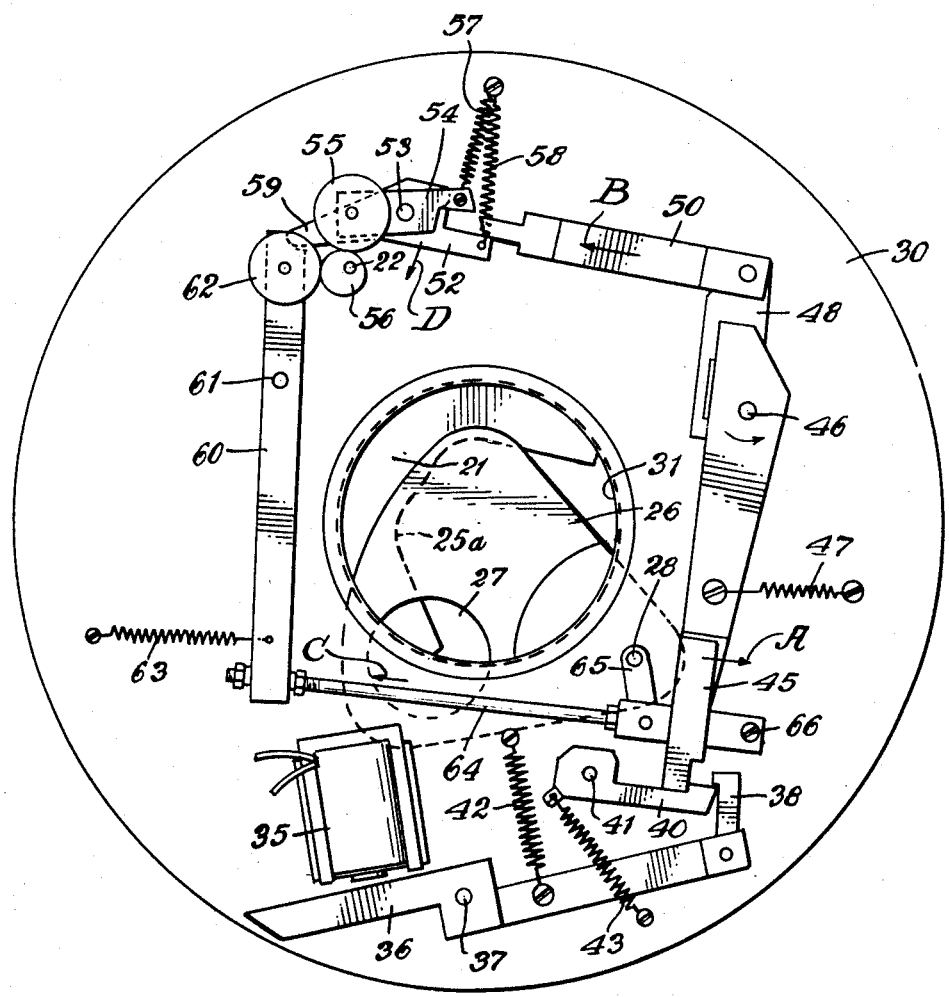
Fig. 3 illustrates another bottom view of the rotary shutter.

Referring to the drawings, the shutter is provided with a circular frame 6 provided with an inwardly extending flange 7 having a circular aperture 5 for the passage of light passing through the lenses of the camera objective (not shown). In the flange 7 of the frame 6 are mounted by means of ball bearings 8 four shafts 9 parallel to the optical axis, equally radially spaced therefrom and spaced circumferentially 90° apart. (Figs. 1 and 3). The lower end of each shaft 9 has attached thereto a circular shutter disc 11 provided with a recess 12 in its circumference. Each two diametrically opposed discs 11 are arranged in the same plane so that all four shutter discs 11 will be arranged in two planes which are spaced, and parallel to each other. The diameters of the rotary discs 11 are of such a size that the discs in the same plane almost touch each other in the optical axis. Furthermore, all four discs 11 are driven simultaneously with the same speed and the recesses 12 are arranged in such a manner that they move all at the same time into the lens aperture to uncover the same. Each shaft 9 has attached to the upper end a gear 13 and all four gears mesh with the inner teeth 14 of an annular gear 15 supported in a ball bearing 17 in the flange 7 of the frame 6. The annular gear 15 is provided with exterior gear teeth 16 engaged by a gear 18 which in turn is driven by another gear 19 which is positively driven by a motor not shown. The recesses 12 in all of the four rotary discs 11 have the same peripheral length and the same radial depth. In other words, all of the recesses 12 are alike and are positioned symmetrically with respect to each other, as particularly shown in Fig. 2.

Figure 4:
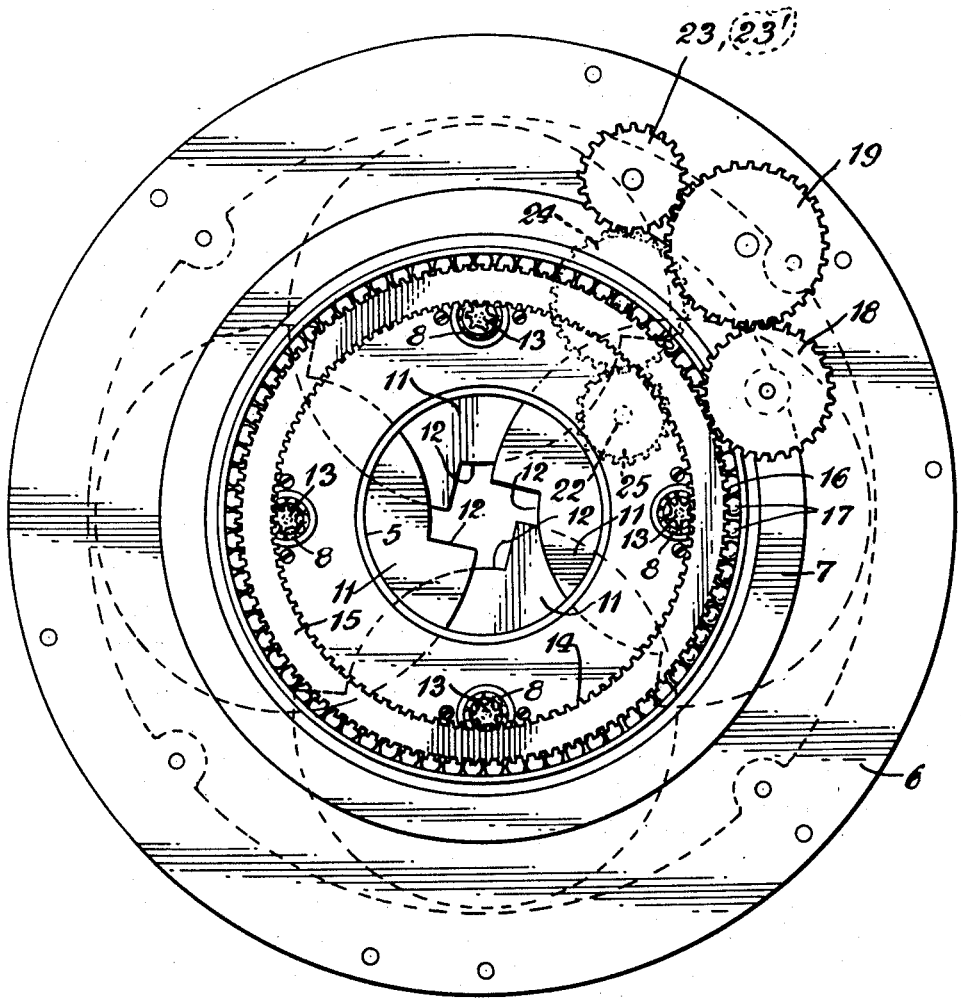
Fig. 4 is a top plan view of the shutter illustrated in Fig. 1.
Figure 5:
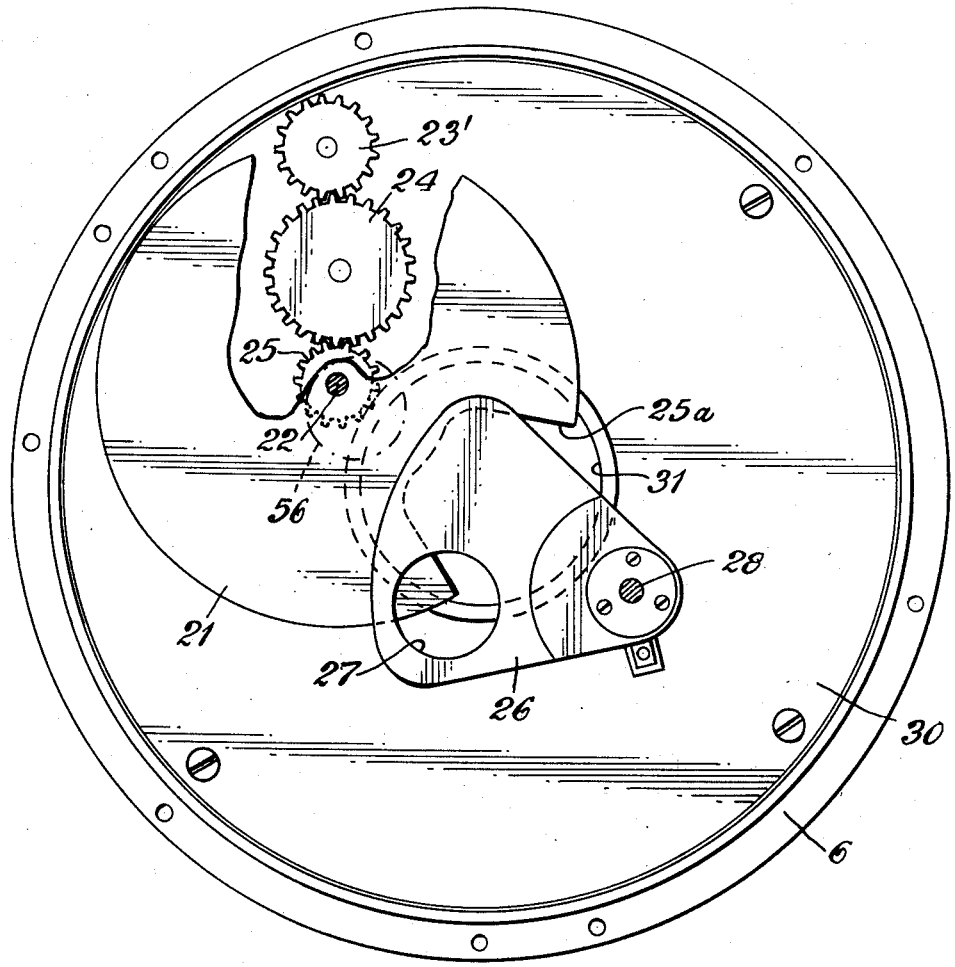
Fig. 5 is another view illustrating in detail the drive of the pivotally mounted shutter blade.

The gearing 18, 19 for driving the annular gear 15 is also connected by another gearing with an additional shutter disc 21 mounted on a vertical shaft 22 extending parallel to the vertical shafts 9 of the four rotary shutter discs 11. This gearing is particularly shown in Figs. 4 and 5 and consists of a pinion 23, an intermediate gear 24, and another pinion 25 on the shaft 22 of the shutter disc 21. The transmission ratio is such that the additional shutter disc 21 is driven with a slower speed than the four shutter discs 11. The additional shutter disc 21 is provided with a marginal recess 25a.

Since the disc 21 rotates slower than the four discs 11, it in fact selects a certain succession of the successive exposure positions of the rotary shutter discs 11. According to this succession, there takes place for the taking of a series of successive pictures the necessary exposures by the pivotal movement of a shutter blade 26, which is mounted on a shaft 28 and is provided with an aperture 27 adapted to be brought into axial alignment with the optical axis. For this purpose, the last mentioned pivotally mounted shutter blade 26 is connected with an exposure regulator. Since the rotary discs 11 have the greatest speed, the same determine the exposure time.

In order to assure that also when the exposure times are very short—namely, when the rotary discs 11 are driven with a high speed, the shutter blade 26 will always accurately move into alinement with the optical axis at the time the discs 11 and also the additional disc 21 are in open position, the present invention provides a special control device. This control device is particularly illustrated in Fig. 3, and is mounted on a circular plate 30 mounted in the frame 6 and having a central aperture 31 in alinement with the frame aperture 5.

A release impulse produced by a not illustrated exposure regulator, energizes an electromagnet 35 when a circuit is closed. Upon energization, the magnet 35 attracts a lever 36 rotatable about a pin 37. The lever 36 is provided at one end with a hook-like projection 38, and pulls a lever 40 downwardly which is rotatable about a pin 41. Both levers 36 and 40 are normally under the action of tension springs 42 and 43 which upon interruption of the current supply to the magnet 35, return the levers 36 and 40 to their starting positions. The lever 40 engages with a shoulder a lever 45 rotatable about a pin 46. When the lever 40 is pulled downwardly, its shoulder releases the lower end of the lever 45 and a spring 47 attempts to move the lever 45 in the direction of the arrow A. The upper arm 48 of the lever 45 is provided with a lateral extension 50 which under the action of the spring 47 is normally urged in the direction of the arrow B. The extension 50 engages with its outer end a lever 52 movable about a pin 53. The pin 53 supports also rotatably another lever 54 provided with a circular disc 55 which engages with its circumference a rotating cam disc 56. The cam disc 56 rotates in synchronism with the shutter disc 21 so that according to the rotation of the shutter disc 21, the lever 54 is moved back and forth.

A tension spring 57 causes a continuous engagement of the disc 55 with the cam disc 56 while a spring 58 attempts to move the lever 52 into such a position that its arm 59 comes to lie in front of a link 60. The link 60 is rotatable between its ends about a pin 61 and is also provided at one end with a circular disc 62 which, when the arm 59 releases the link 60, engages the cam disc 56, so that also the link 60 is moved by the rotating cam disc 56. The link 60 is connected with a tension spring 63 which assures a safe engagement of the disc 62 with the rotating cam disc 56. The lower end of the link 60 is connected by means of a connecting rod 64 with a lever 65 which actuates the shutter blade 26. The connecting rod 64 has on one of its ends a pin 66 which, when the connecting rod 64 is moved in the direction of the arrow C, returns the lever 45 to its initial position.

The operation of this control device is as follows:

The release impulse of the exposure regulator energizes the electromagnet 35 and this causes a pivotal movement of the levers 36 and 40, which releases the lever 45. When the lever 54 is positioned as shown in Fig. 3, then the extension 50 of the lever 45 can slidably enter the space between the levers 52 and 54 and when this has taken place, both of these levers 52 and 54 are rigily coupled with each other. During the continuous rotation of the cam disc 56, the lever 52 is urged into the direction of the arrow D. This causes a release of the link 60 by the lever arm 59, and now the link 60 is pivoted by the cam disc 56 with the result that the shutter blade 26 by means of the connecting rod 64 and the lever 65 is pivotally moved into the optical axis, so that the aperture 27 in the blade 26 will be in axial alinement with the lens aperture when the disc 62 has the shortest radial distance from the axis of rotation of the cam disc 56. This position of the cam disc 56 corresponds to a position of the shutter disc 21, which is driven by gears 23', 24 and 25, in which the passage of light through the lens system is unobstructed.

When the exposure regulator should release the release impulse in that moment in which the lever 54 lies directly in front of the lateral extension 50 of the lever 45, then there is no space between the levers 52 and 54 and, therefore, the extension 50 of the lever 45 cannot enter into a space between these levers 52 and 54, but remains in engagement with the end face of the lever 54. Only then when the lever 54 is rotated by the cam disc 56 into the position shown in Fig. 3 is it possible for the extension 50 of the lever 45 to move into the space formed by the levers 52 and 54 under the action of the spring 47, whereupon in the described manner a release of the link 60 takes place.

All of the described parts of the control device are mounted on the lower face of the circular plate 30 and are placed around the circular aperture 31 and are spaced in such a manner from the shutter disc 21 and of the shutter blade 26 so as to permit a free movement of the same.

What I claim is:

1. In a rotary disc shutter for photographic cameras, a frame provided with an aperture adapted to be arranged in axial alinement with the optical axis of a photographic objective, a plurality of pairs of circular shutter discs, of which each disc is provided with a marginal recess adapted to form a portion of an exposure aperture, means for continuously and simultaneously rotating all of said shutter discs with the same speed about axes spaced uniformly from said optical axis and spaced uniformly about the same, the axes of rotation of the two shutter discs of each pair being arranged in diametrically opposed relation and the respective shutter discs being disposed in a single plane and their circumference nearly touching each other in the optical axis, there being as many planes in which shutter discs are disposed as there are pairs of shutter discs, the arrangement of said marginal recesses being such that all of the same move at the same time to form a single exposure aperture in axial alinement with said aperture in said frame, the speed of rotation of said shutter discs determining the exposure time, another circular shutter disc rotating in a plane parallel to said pairs of circular shutter discs, said other circular shutter disc being provided with a marginal recess for selecting the successive exposure positions of the shutter discs which determine the exposure time, means for continuously rotating said other circular shutter disc with a slower speed than said plurality of pairs of circular shutter discs, a pivotally mounted apertured shutter blade adapted to close said single exposure aperture and to move with its aperture in alinement with said aperture in said frame for selecting the exposure positions of the rotary shutter discs corresponding to the selected timely succession of the exposures, and means for pivotally moving said apertured shutter blade and controlled by said other circular shutter disc.

2. In a rotary disc shutter according to claim 1, a control means operatively connected with said other circular shutter for causing the movement of said pivotally mounted apertured shutter blade into a position in which the aperture in said blade is in alinement with the aperture in said frame.

3. In a rotary disc shutter for photographic cameras, a frame provided with an aperture adapted to be arranged in axial alinement with the optical axis of a photographic objective, a plurality of pairs of circular shutter discs, of which each disc is provided with a marginal recess adapted to form a portion of an exposure aperture, means for continuously and simultaneously rotating all of said shutter discs with the same speed about axes spaced uniformly from said optical axis and spaced uniformly about the same, the axes of rotation of the two shutter discs of each pair being arranged in diametrically opposed relation and the respective shutter discs being disposed in a single plane and their circumference nearly touching each other in the optical axis, there being as many planes in which shutter discs are disposed as there are pairs of shutter discs, the arrangement of said marginal recesses being such that all of the same move at the same time to form a single exposure aperture in axial alinement with said aperture in said frame, the speed of rotation of said shutter discs determining the exposure time, another circular shutter disc adapted to cover with its circular marginal portion the exposure aperture formed by the marginal recesses in said plurality of pairs of circular shutter discs, said other circular shutter disc being provided with a marginal recess for selecting the successive exposure positions of the shutter discs which determine the exposure time, means operated by said means for rotating said plurality of shutter discs for continuously rotating said other circular shutter disc with a slower speed than said plurality of pairs of circular shutter discs, a pivotally mounted apertured shutter blade adapted to close said single exposure aperture to move with its aperture in alinement with said aperture in said frame for selecting the exposure positions of the rotary shutter discs corresponding to the selected timely succession of the exposures, a control means for causing the movement of said pivotally mounted apertured shutter blade into a position in which the aperture in said blade is in alinement with the aperture in said frame, said control means including a cam disc on the rotatable other circular shutter disc and a lever mechanism actuated by said cam disc, a locking means for normally holding said lever mechanism in a position for preventing actuation of said cam disc until said locking mechanism is operated, and means for operating said locking mechanism.

References Cited in the file of this patent

UNITED STATES PATENTS

| | | |
|---|---|---|
| 2,350,355 | Hoffmann | June 6, 1944 |
| 2,367,526 | Riddell | Jan. 16, 1945 |
| 2,383,381 | Hammond | Aug. 21, 1945 |